(12) United States Patent
Ramey et al.

(10) Patent No.: US 7,984,809 B1
(45) Date of Patent: Jul. 26, 2011

(54) SYSTEM AND METHOD FOR DIRECTING INDICATOR-BASED SORTATION OF SHIPMENTS

(75) Inventors: Patrick W. Ramey, Mountlake Terrace, WA (US); Eugene M. Gard, Lexington, KY (US); Eric Young, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 448 days.

(21) Appl. No.: 12/257,078

(22) Filed: Oct. 23, 2008

(51) Int. Cl.
*B07C 5/00* (2006.01)
*B07C 7/04* (2006.01)
*B03B 7/00* (2006.01)
*B07B 15/00* (2006.01)
*G06K 9/00* (2006.01)
*B65G 1/00* (2006.01)
*B65G 65/00* (2006.01)

(52) U.S. Cl. ....... 209/546; 209/44.4; 209/549; 209/583; 209/584; 209/702; 209/703; 209/942; 198/347.1; 414/266

(58) Field of Classification Search .................. 209/44.4, 209/546, 549, 583, 584, 702, 703, 900, 942; 198/347.1, 347.4, 370.01, 580; 414/266
See application file for complete search history.

(56) References Cited

U.S. PATENT DOCUMENTS

| | | | |
|---|---|---|---|
| 4,254,875 A * | 3/1981 | Varhelyi ...................... 209/547 |
| 5,363,310 A | 11/1994 | Haj-Ali-Ahmadi et al. |
| 5,406,770 A | 4/1995 | Fikacek |
| 5,509,538 A * | 4/1996 | Spindler et al. ............... 209/630 |
| 5,720,157 A | 2/1998 | Ross |
| 5,794,789 A | 8/1998 | Payson et al. |
| 5,875,434 A * | 2/1999 | Matsuoka et al. .............. 705/28 |
| 6,061,607 A | 5/2000 | Bradley et al. |
| 6,478,144 B1 | 11/2002 | Sweazy |
| 6,610,954 B2 * | 8/2003 | Takizawa ...................... 209/583 |
| 6,651,820 B2 * | 11/2003 | Takizawa ...................... 209/546 |
| 6,685,031 B2 * | 2/2004 | Takizawa ...................... 209/546 |
| 6,715,267 B2 * | 4/2004 | Schaefer et al. ................ 53/498 |
| 6,737,600 B2 * | 5/2004 | Takizawa ...................... 209/583 |
| 6,784,391 B2 * | 8/2004 | Takizawa ...................... 209/583 |
| 2003/0116484 A1 * | 6/2003 | Takizawa ...................... 209/630 |
| 2003/0222001 A1 * | 12/2003 | Christ .......................... 209/584 |
| 2006/0278501 A1 | 12/2006 | Sweazy |
| 2008/0264838 A1 * | 10/2008 | Limpens ....................... 209/703 |
| 2009/0081008 A1 * | 3/2009 | Somin et al. ............. 414/222.07 |

* cited by examiner

*Primary Examiner* — Stefanos Karmis
*Assistant Examiner* — Brett C Martin
(74) *Attorney, Agent, or Firm* — Robert C. Kowert; Meyertons, Hood, Kivlin, Kowert & Goetzel, P.C.

(57) ABSTRACT

Various embodiments of a system and method for directing indicator-based sortation of shipments are described. In various embodiments, a control system may be configured to utilize indicators to direct the sortation of items in a materials handling facility, such as an order fulfillment center tasked with fulfilling customer orders for one or more items. For a given unsorted item, the control system may cause an indicator to indicate to which of multiple sorting slots the given item is to be placed, thereby sorting the item to its respective shipment assigned to the sorting slot. In various embodiments, the shipment sorting units may be serviced from a rebin side as well as a pack side. The control system may be configured to prioritize the processing of such shipments by utilizing indicators associated with respective shipment sorting slots on the pack side to indicate a priority for processing a given shipment.

49 Claims, 9 Drawing Sheets

SYSTEM AND METHOD FOR DIRECTING INDICATOR-BASED SORTATION OF SHIPMENTS

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to herein as fulfillment centers). The inventory items are ordered from one or more vendors, received at the materials handling facilities as inbound shipments, and stocked in inventory of the materials handling facilities. In an order fulfillment process, orders for items may be received from customers of the distributor. Units of the ordered items are picked from various locations in the inventory in the materials handling facilities, processed for shipping, and shipped as outbound shipments to the customers.

The order fulfillment process may include a sortation process, in which units of items picked for orders are sorted into their respective orders. For example, requests (e.g., orders) for units of items from requestors may be divided among multiple agents, who then pick units corresponding to the requests. The orders may be subdivided among the agents; therefore, two or more of the agents may pick units for one order. Consequently, a sort operation to select the proper units of items for given orders from the aggregations of units returned by each respective agent is required. Conventionally, sorting may be performed using automated sorting mechanisms or manual sorting systems. Automated sorting mechanisms for sorting certain types of inventory units according to individual orders include, but are not limited to, the Crisplant® sorter, Eurosort® sorters, and automated sorting mechanisms offered by other vendors. Using an automated sorting mechanism, incoming picked units of items for multiple different customer orders are received at the automated sorting mechanism and sorted by the automated mechanism according to individual shipments. Once items are sorted into respective shipments, each shipment can be packaged and shipped to respective customers.

Error Prone Manual Sortation Techniques

Instead of using completely automated or mechanized sorting techniques, some sortation systems direct agents to sort items into respective shipments. For example, one of such agents may be responsible for separating a given workload of ordered items into respective shipments to be sent to customers as specified by a sortation system. Errors in the composition of sorted shipments, such as shipments with too few or too many of a given item, can occur even in cases where the sortation system correctly specifies to which shipment a given item is to be sorted. For example, due in part to the shear number of shipments an agent may be sorting at any given moment, an agent may mistakenly sort a given item to the wrong shipment. Such a mistake can create a shortage of the given item in one shipment and an overage of the item in another shipment.

Figure 1:
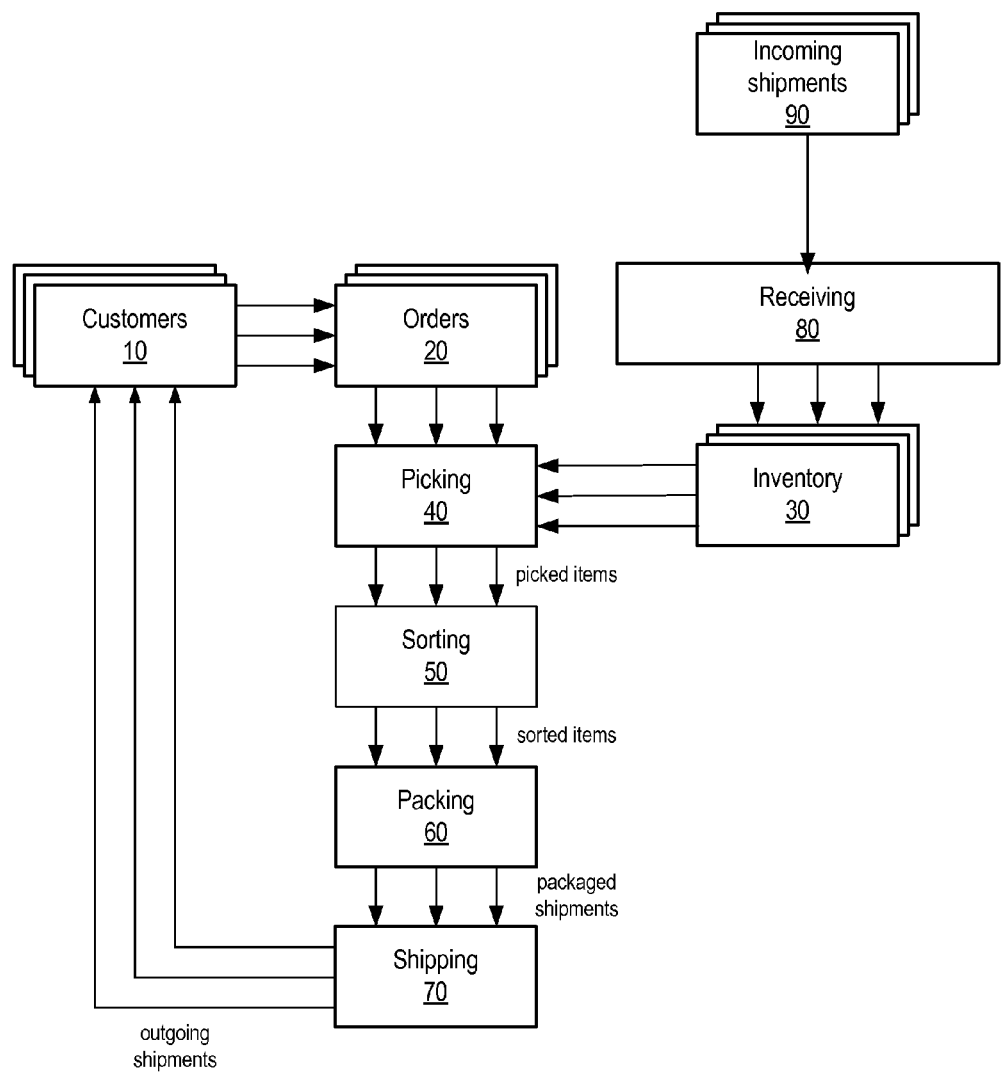
FIG. 1 illustrates a logical representation or view of the operation of a materials handling facility in which embodiments of the system and method for directing indicator-based sortation of shipments may be implemented.

While various embodiments are described herein by way of example for several embodiments and illustrative drawings, those skilled in the art will recognize that various embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of various embodiments as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for directing indicator-based sortation of shipments are described. In various embodiments, a control system may be configured to utilize indicators to direct the sortation of items in a materials handling facility, such as an order fulfillment center tasked with fulfilling customer orders for one or more items. Each indicator may be a light, an audio signal, or some other mechanism or combination of mechanisms capable of conveying audio, visual, and/or other information to a human operator. Alternatively, the indicator may be textual or graphical directions displayed on a monitor of a computer, handheld device, etc., or printed to paper output. Various embodiments may include a shipment sorting unit that includes multiple shipment sorting slots (or simply "slots") each of which may be associated with a given shipment. For a given unsorted item, the control system may cause an indicator to indicate to which of such sorting slots the given item is to be placed, thereby sorting the item to its respective shipment. For example, the control system may, in response to an item identifier being read or scanned into the control system, activate an indicator associated with a sorting slot to indicate to an agent that the sorting slot is where the unit is to be placed. The aforementioned placement of an item into a respective sorting slot may be referred to herein as a put operation. Also note that the term shipment may be used herein to describe a group of one or more items that are to be shipped from the materials handling facility, such as to fulfill customer orders. In some cases, such shipment may reside in an unpacked state, such as when the items of the shipment are placed in a shipment sorting slot of the shipment sorting unit. In other cases, such shipment may reside in a partially or fully packed state such as when an item is packed into a shipping container for shipment.

In various embodiments, the shipment sorting units described herein may at any given moment have a fixed capacity of sorting slots. Accordingly, to continue sorting items into shipments, completely sorted shipments in a shipment sorting unit may be moved to make room for additional shipments. In some cases, to make room for additional shipments to be sorted, a given completely sorted shipment may be moved to another location within its shipment sorting slot or removed from its shipment sorting slot altogether. Such movement may be referred to herein as a push-through operation. In various embodiments, such push-through operations are specified by the control system. For a given push-through operation, the control system may cause an indicator to indicate which of such sorting slots contains the completely sorted shipment that is to be moved. In this way, an agent may be notified of the correct shipment on which the push-through operation is to be performed and perform the push-through accordingly.

In various embodiments, the control system described herein may be configured to separate to some extent the put operations for sorting items to respective shipments and the push-through operations for moving completely sorted shipments. By separating the sorting operations and the push-through operations, the control system may prevent various errors, such as an agent mistakenly performing a put operation when the control system specified a push-through operation and vice versa. To separate put operations and push-through operations, the control system may be configured to temporarily halt put operations and, only while such put operations are halted, indicate that push-through operation(s) are to be performed. The control system may also be configured to determine when such push-through operation(s) are completed and at that time resume put operations. By separating put operations and push-through into separate time periods, agent errors may be reduced or completely mitigated. As described in more detail below, the control system may be configured to determine when push-through operation(s) are to be performed based on one or more processing thresholds.

In various embodiments, the order sorting units described herein may be serviced from two different sides. On one side (which may be referred to herein as the "rebin" side), the aforementioned put operations and push-through operations may be performed. On the other side (which may be referred to herein as the "pack" side), packing (or other shipment related activities, e.g., gift wrapping) may be performed for various completely sorted shipments that have been pushed-through to the pack side. As is the case for the rebin side of the shipment sorting slots of the order sorting unit, the control system may use indicators to direct processing (e.g., removal of a completely sorted shipment from its respective sorting slot, packing the completely sorted shipment into a shipping container, etc.) of the completely sorted shipments on the pack side of the shipment sorting unit. Such processing may include, among other shipping-related activities, removing the completely sorted shipment from its respective sorting slot or packing the completely sorted shipment into a shipping container for shipment. At any given moment, multiple completely sorted shipments may reside on the pack side of the order sorting unit. As described in more detail below, the control system may be configured to prioritize the processing of such shipments by utilizing indicators associated with respective shipment sorting slots to indicate a priority for processing a given shipment.

Overview of the Materials Handling Facility

FIG. 1 illustrates a logical representation or view of the operation of a materials handling facility in which various embodiments may be implemented. For example, this Figure may illustrate a materials handling facility of a product distributor or e-commerce enterprise. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to an induction station, where the items are inducted into a sorting system (e.g., a sorting mechanism, sorting process, or some combination thereof). The items may then be routed to particular destinations in accordance with the requests (orders) currently being processed, e.g. to sorting stations, under direction of the control system. Various sorting mechanisms and processes (which may be represented by sorting 50) are described in more detail below. A picked, packed and shipped order does not necessarily include all of the items ordered by the customer; an outgoing shipment to a customer may include only a subset of the ordered items available to ship at one time from one inventory-storing location. In other cases, items of the order may be split into multiple shipments for a variety of reasons including but not limited to space and/or economic efficiency. For instance, shipping a set of items in three small shipments may be less expensive than shipping the set of items in one large shipment.

A materials handling facility may also include a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities.

Figure 2:
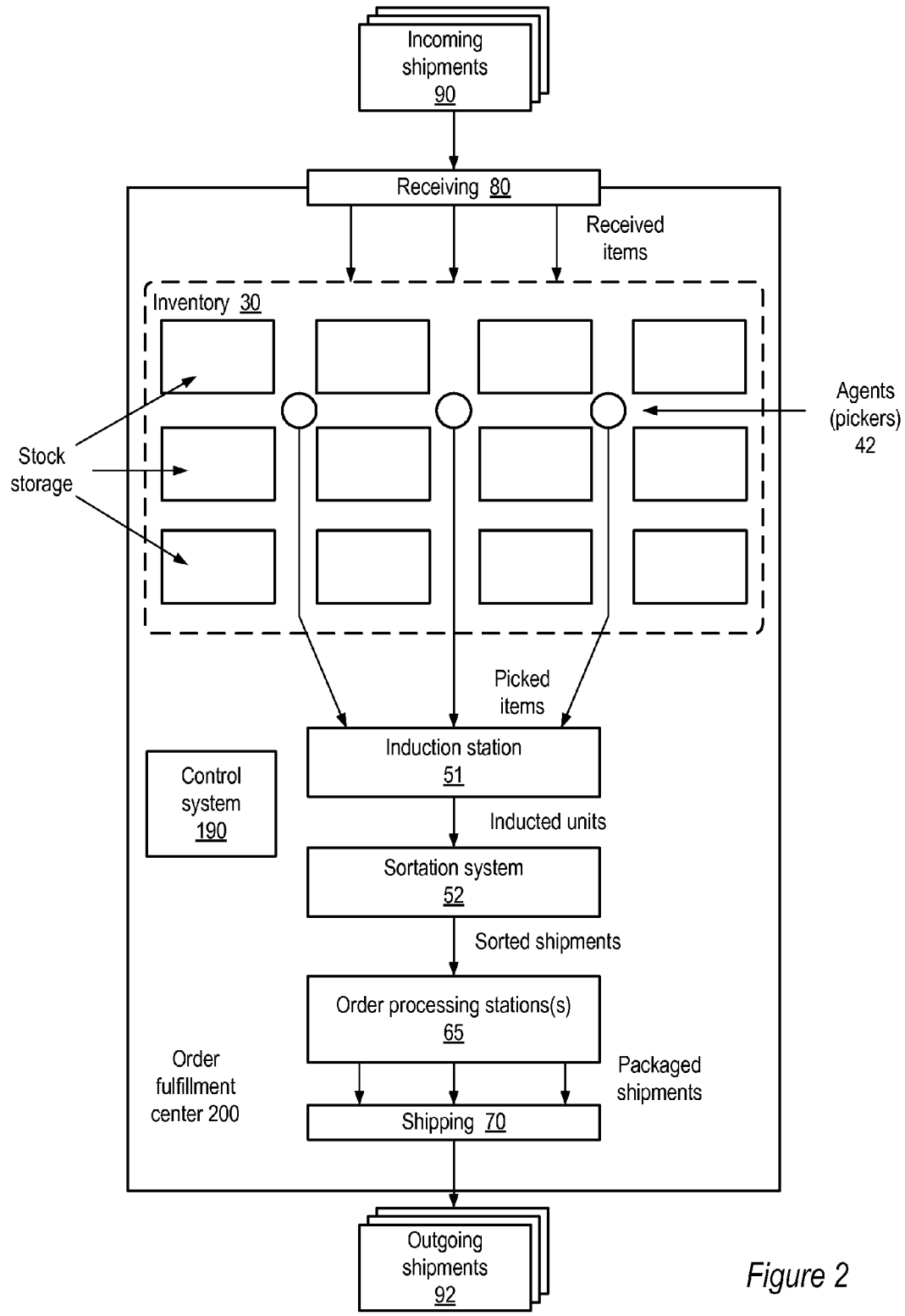
FIG. 2 illustrates one embodiment of the physical layout of a materials handling facility, according to some embodiments.

FIG. 2 illustrates an example of a physical layout of a materials handling facility, such as an order fulfillment facility or center, in which embodiments of the control system may be implemented. At any one time, one or more agents 42 of the distributor may each be picking items from inventory 30 to fulfill portions or all of one or more requests or orders. This may result in multiple items (e.g., a stream of items and/or batches of picked items) for multiple incomplete or complete orders, which may then be delivered to an induction station 51 for sortation system 52, which may include sorting mechanisms and/or sorting processes for sorting items into respective shipments of items. For example, in some embodiments, the induction point may refer to a station where items may be inducted into a conveyance mechanism for conveying items to sorting stations configured for sorting items into respective shipments.

In some embodiments, the conveyance mechanism (under direction of the control system) may then deliver the items to various order processing stations 65, which may include one or more packing stations, in the materials handling facility for processing prior to shipping 70. Portions of an order may be received from the pickers 42, or from other stations, at a processing station 65 at different times, so processing at a station may have to wait for one or more items for some orders to be delivered to the station from picking and/or from another station before completion of processing of the orders at the station. The picked items of items delivered to a processing station via a conveyance mechanism may be processed at a processing station 55, for example sorted into their respective orders at a sorting station under direction of the control system. Once the processing of items for an order is completed at a station, the items may be delivered to another station for further processing, for example to a sorting station to be sorted into orders, or to a packing station to be packaged for shipping 70.

A materials handling facility may also include one or more receiving 80 operations for receiving shipments 90 of stock from various vendors. The received stock may then be placed into stock storage. The receiving 80 operation may also receive and process returned, purchased, or rented items from customers. The various operations and stations of a materials handling facility may be located in one building or facility, or alternatively may be spread or subdivided across two or more buildings or facilities.

In various embodiments, control system 190 may generate and/or maintain a stored indication of the state of each item within the materials handling facility (e.g., each item might have its own record in a database of the control system). For example, such a stored indication may indicate, for each of one or more of the items within the materials handling facility, the location of the item (e.g., storage, induction station, sortation system, order processing station, etc.) and/or the fulfillment process that the item is currently undergoing (e.g., induction, sorting, packing, shipping, etc.).

Indicator-Based Sortation of Shipments

Figure 3:
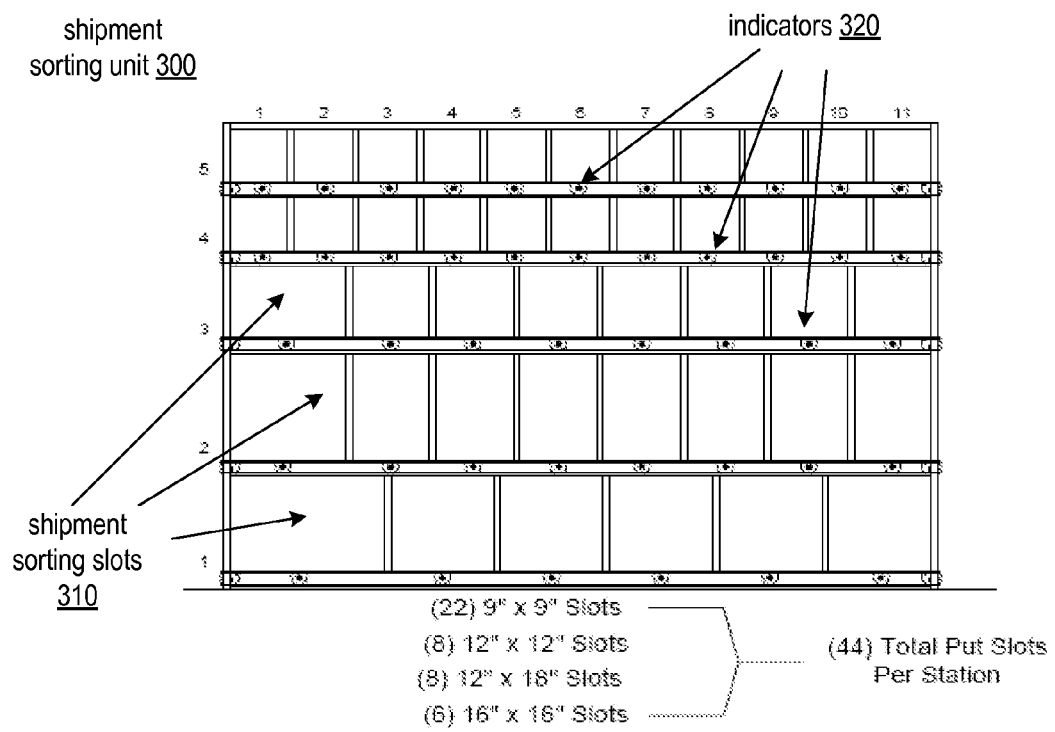
FIG. 3 illustrates one example of a shipment sorting unit that includes multiple shipment sorting slots, according to some embodiments.

As described above, the control system (e.g., control system 190) may be configured to utilize indicators to direct the sortation of items in a materials handling facility, such as an order fulfillment center tasked with fulfilling customer orders for one or more items. Each indicator under the control of control system 190 may be a light, an audio signal, or some other mechanism or combination of mechanisms capable of conveying audio, visual, and/or other information to a human operator. Alternatively, the indicator may be textual or graphical directions displayed on a monitor of a computer, hand-held device, etc., or printed to paper output. Various embodiments may include shipment sorting units that include multiple shipment sorting slots each of which may be associated with a given shipment. Such shipment sorting slot may be implemented as part of sorting 50 described above. For a given unsorted item, the control system may cause an indicator to indicate to which of such sorting slots the given item is to be placed, thereby sorting the item to its respective shipment. For example, the control system may, in response to an item identifier being read or scanned into the control system, activate an indicator associated with a sorting slot to indicate to an agent that the sorting slot is where the unit is to be placed. One example of a shipment sorting unit is illustrated by FIG. 3. As illustrated, shipment sorting unit 300 may include multiple shipment sorting slots 310 in which various items may be sorted into shipments. Note that in the illustrated embodiment, the shipment sorting unit includes shipment sorting slots of different sizes; however, in some embodiments the shipment sorting slots may each have the same dimensions, such as illustrated in FIGS. 4A-E.

Figure 4A:
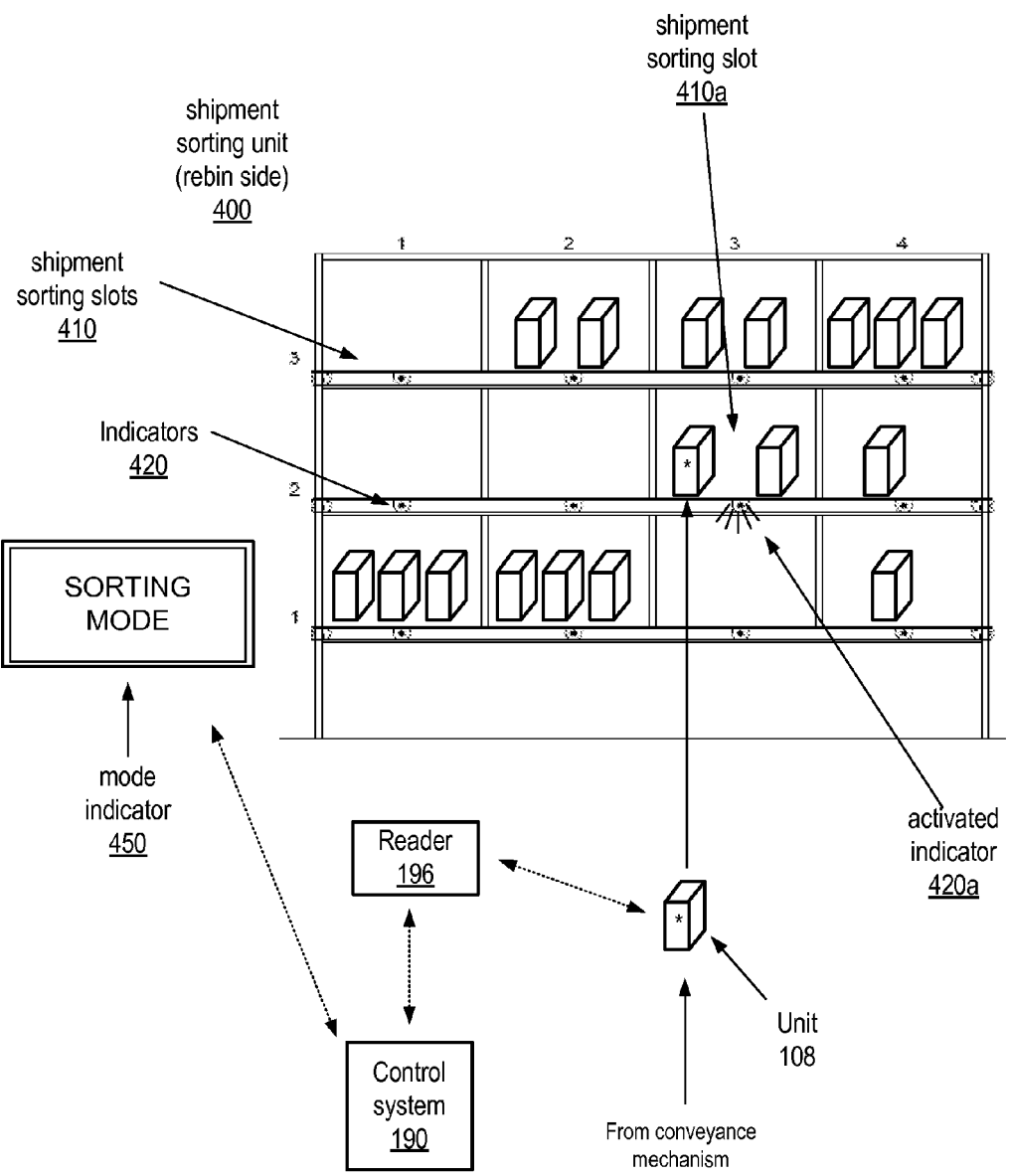
FIGS. 4A-E illustrate a control system directing the sortation of items via indicators associated with shipment sorting slots of a shipment sorting unit according to some embodiments.

FIG. 4A illustrates a "sorting mode" of operation in which put operations (described above) are performed. As illustrated, shipment sorting unit 400 includes multiple shipment sorting slots similar to the shipment sorting slots described above with respect to FIG. 3. For simplicity, the illustrated shipment sorting slots have uniform dimensions; however, in other embodiments, shipment sorting units including sorting slots of varying sizes may be utilized. In the sorting mode of operation, items arrive at the shipment sorting unit from other locations within the materials handling facility, such as inventory 30. In various embodiments, items such as unit 108 are delivered to shipment sorting units via one or more conveyance mechanisms, such as a conveyor or sliding shoe sorter. In various embodiments, the control system may determine the identity of such items either directly or through an intermediary component, such as reader 196. For instance, in some embodiments, an agent may scan a unit 108 with reader 196, which may be a fixed, mobile, or hand-held reader. In various embodiments, the reader may utilize optical or wireless technologies (e.g., Radio Frequency Identifier or "RFID") to determine an identifier of unit 108. For instance, an identifier such as a readable barcode or RFID tag may be affixed to the item. Alternatively, in some embodiments, units may be transported within the materials handling facility within conveyance receptacles (e.g., totes or trays). In such cases, the identifier read may be an identifier of the receptacle, which may also identify the unit carried within the receptacle.

In any case, the control system 190 is configured to determine the identity of unit 108 and assign the unit to a particular shipment sorting slot, such as one of shipment sorting slots 410. In the illustrated embodiment, unit 108 is assigned to shipment sorting slot 410a by the control system. To indicate to an agent the particular put operation that is to be performed (i.e., the particular shipment sorting slot in which the unit is to be placed), the control system may cause indicator 420a (which is dedicated to shipment sorting slot 410a) to activate. In various embodiments, activating an indicator may include causing the indicator to: become illuminated, emit audio, display a message, and/or indicate some other information that may be perceived by an agent, such as a human operator. An activated indicator indicates that the associated sorting slot (slot 410a in the illustrated example) is the sorting slot in which the current unit (unit 108) is to be placed, as illustrated in FIG. 4A. The above described process may be repeated for multiple other units. As units are placed in respective sorting slots, one or more sorting slots will eventually contain completely sorted shipments, which may later be packed for shipping from the materials handling facility.

In various embodiments, the control system may be configured to determine when an agent has successfully placed an item in a shipment sorting slot. For instance, the agent may be required to indicate confirmation of successful placement by activating a control, button or other input device accessible to the control system. In some embodiments, the control system may include one or more weight, motion, optical or other sensors to determine that items have been successfully placed in respective shipment sorting slots. For instance, such sensors may be strategically place within or proximate to each shipment sorting slot.

The control system may also be configured to indicate the current mode of operation to an agent, as illustrated by mode indicator 450, which may be a display or other device under the control of control system 190. In the illustrated example, mode indicator 450 indicates that the system is currently in sorting mode. In various embodiments, when the system is in sorting mode, only put operations may be performed on the shipment sorting unit. In particular, an indication that the system is in sorting mode notifies agents that push-through operations (described in more detail below) may not be performed. By only allowing one put operation at a given time during the sorting mode, control system 190 can reduce the risk of put errors being performed by agents. Note that in some embodiments an explicit mode indicator may not be present and that the sorting mode may be implicit by the fact that only one indicator is currently activated. Such a technique may be employed because, as described in more detail below, the other primary mode of operation (e.g., the delivery mode, described below) activates multiple indicators in many embodiments. Accordingly, an agent can easily discern which mode of operation in which the system resides by the number of indicators that are activated. For instance, in the sorting mode one or less indicators will be activated. In the delivery mode, more than one indicator will be activated, as described in more detail below.

In various embodiments, the shipment sorting units described herein may at any given moment have a fixed capacity of sorting slots. For instance, in the illustrated embodiments of FIGS. 4A-E, shipment sorting unit 400 includes 12 shipment sorting slots. Accordingly, to ensure that the sorting of items is a fluid operation unburdened by delays due to a full or nearly-full sorting unit, completely sorted shipments in the shipment sorting unit may at various times be moved to make room for additional shipments. In some cases, to make room for additional shipments to be sorted, a given completely sorted shipment may be moved to another location within its shipment sorting slot or removed from its shipment sorting slot altogether, which is referred to herein as a push-through operation as described above. In various embodiments, such push-through operations are specified by the control system. For a given push-through operation, the control system may cause an indicator to indicate which of such sorting slots contains the completely sorted shipment that is to be moved. In this way, an agent may be notified of the correct shipment on which the push-through operation is to be performed and perform the push-through accordingly.

Figure 4B:
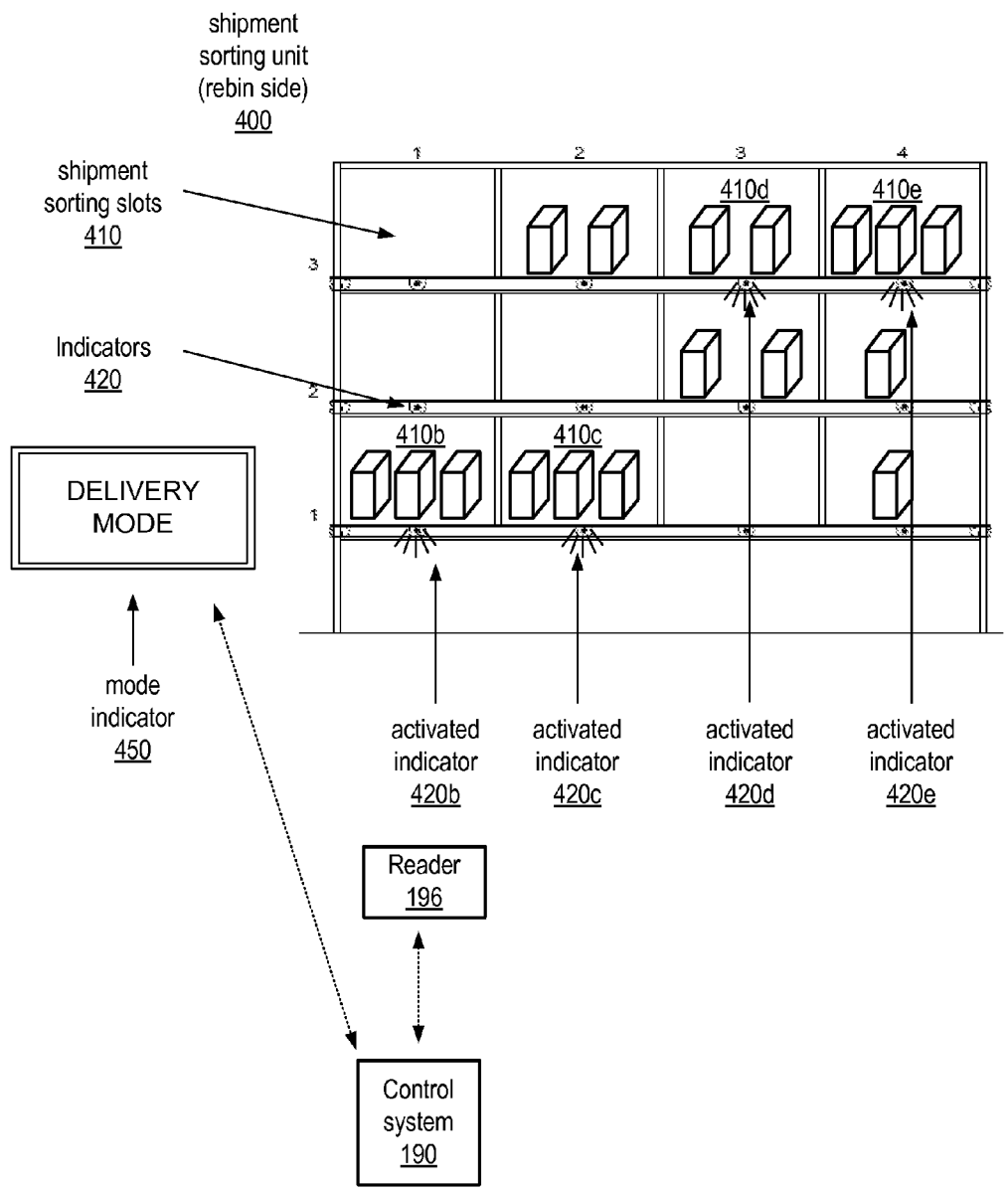

In the illustrated embodiment of FIG. 4B, the sorting system is illustrated in the "delivery mode," in which push-through operations are performed. In various embodiments, the control system described herein may be configured to separate the put operations for sorting items to respective shipments (i.e., the sorting mode of operation) and the push-through operations for moving completely sorted shipments (i.e., the delivery mode of operation). By separating the modes of operation, the control system may prevent various errors, such as an agent mistakenly performing a put operation when the control system specified a push-through operation and vice versa. To separate put operations and push-through operations, the control system may be configured to temporarily halt put operations and, only while such put operations are halted, indicate that push-through operation(s) are to be performed. To do so, the control system may generate an instruction to the agent to halt the put operations of FIG. 4A by indicating that the system is now in the delivery mode. For example, the control system may generate an explicit indication such as that displayed by mode indicator 450 of FIG. 4B, which indicates that the system is in the delivery mode. Such display may indicate to the agent that the system is in the delivery mode and that put operations can not be performed while the system is in the delivery mode. By limiting an agent to only one type of operation at a time (e.g., either a put or push-through operation), the control system may prevent agent errors, such as occurs when an agent performs a push-through operation when a put operation was specified and vice versa.

The control system may be configured to indicate that particular completed shipments are to be moved from their current locations in each respective shipment sorting slot. In one embodiment, the control system may be configured to indicate that a given completed shipment is to be pushed-through to the other side of the shipment sorting slot (this is illustrated in more detail with respect to FIGS. 4C-D). To indicate to an agent that particular completed shipments are to be pushed-through, the control system may be configured to activate the indicators that correspond to the shipment sorting slots containing completely sorted shipments. In the illustrated embodiment of FIG. 4B, the control system has activated indicators 420*b-e* to indicate that the completed shipments within sorting slots 410*b-e* are to be moved from their current locations, such as by pushing the completed shipments to the other side (e.g., the pack side, see FIGS. 4C-D) of the shipment sorting unit. Note that mode indicator 450 indicates that put operations are not to be performed while the system resides in the delivery mode. In some cases, other devices, such as reader 196, may also indicate to an agent that put operations are not to be performed while the system resides in the delivery mode. In some embodiments an explicit mode indicator may not be present and the delivery mode may be implicitly indicated by the fact that more than one indicator is currently activated. Such a technique may be employed because the other primary mode of operation (e.g., the sorting mode) activates one or less indicators in many embodiments. Accordingly, an agent can easily discern which mode of operation in which the system resides by the number of indicators that are activated. For instance, in the sorting mode one or less indicators will be activated. In the delivery mode, more than one indicator will be activated.

Figure 4C:
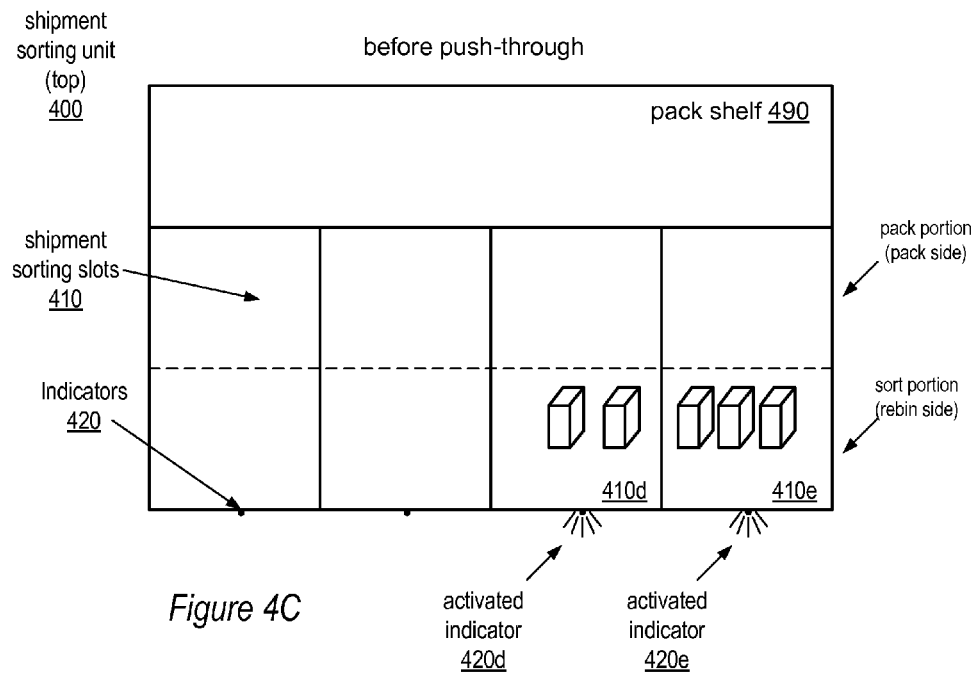
Figure 4D:
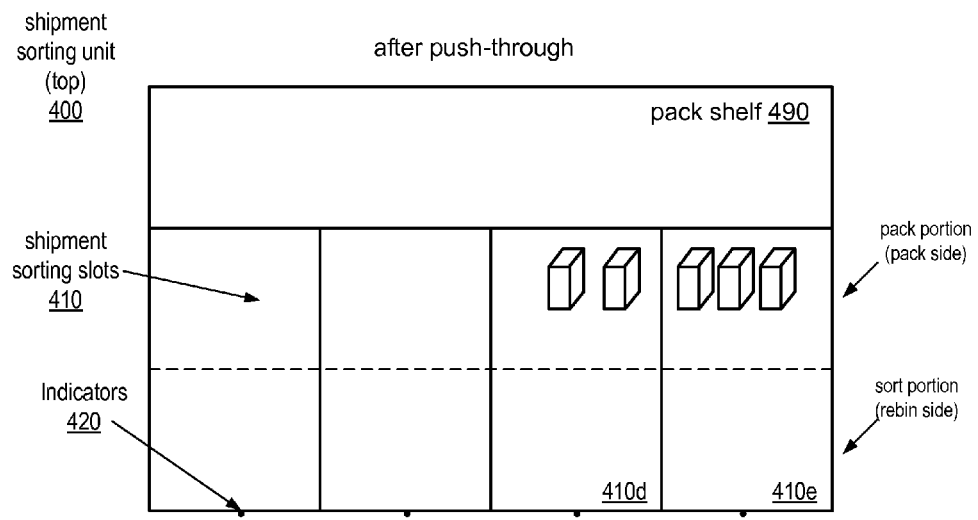

FIGS. 4C-D illustrate an exemplary push-through operation performed on the completed shipments of shipment slots 410*d* and 410*e*. In the illustrated embodiment of FIG. 4C, the completed shipments of shipment slots 410*d* and 410*e* reside in a sort portion of the respective shipment slot. For a given shipment sorting slot, a sort portion may include the portion of the slot in which shipments are stored during the sorting mode of operation. Since indicators 420*d*-420*e* are activated, the agent manning shipment sorting unit 400 is instructed to perform a push through operation on the completed shipments residing in sorting slots 410*d-e*. FIG. 4D illustrates the shipment sorting unit after the aforementioned push through operation. Note that each completed shipment now resides in the respective pack portion of its sorting slot. As described in more detail below, by performing a push-through operation on a given completed shipment, an agent on the pack side of the shipment sorting unit may be enabled to remove the shipment (such as by placing the shipment on pack shelf 490) for additional processing stages (e.g., packing, gift wrapping, etc.).

In some embodiments, the control system may also be configured to determine when such push-through operation(s) are completed and at that time resume put operations. By separating put operations and push-through into separate time periods, agent errors may be reduced or completely mitigated. Additionally, the control system may be configured to determine when push-through operation(s) are to be performed based on one or more processing thresholds. In one embodiment, one such processing threshold may specify a period of time since the system was last in the delivery mode. For instance, if a threshold of 10 minutes is implemented, the control system may ensure that a push through operation is performed every 10 minutes. This may ensure that the rebin side of the order sorting unit does not become deadlocked with too many completed shipments. In various embodiments, one such processing threshold may specify a particular quantity of completed shipments in the shipment sorting unit. For instance, if a shipment sorting unit has 12 sorting slots and the shipment sorting unit is never to be more than half full, the processing threshold may be set to 6 completed shipments. In some cases, such a threshold may be specific to a particular size of sorting slots. For example, in the case where a shipment sorting unit contains various sorting slot sizes (e.g., FIG. 3), thresholds may be applied to particular sizes of sorting slots. For instance, in the sorting unit of FIG. 3, there are six 16" by 16" sorting slots. A threshold of, e.g., three completed shipments could be applied to such sorting slots to ensure that the control system will indicate that a push operation is to be performed if half or more of the 16" by 16" sorting slots contain completed shipments. In other embodiments, such thresholds may be applied to other sorting sizes.

In various embodiments, the control system may be configured to monitor the incoming workload of an agent manning the rebin side of the shipment sorting unit. For instance, such workload may correspond to shipments undergoing picking in inventory 30 or shipments en route to the shipment sorting unit on a conveyance system. Since such workload may fluctuate while an agent is manning the shipment sorting unit, the control system may be configured to schedule the delivery mode to be activated when the agent has a low point or lull in incoming workload. Such technique may in various embodiments efficiently utilize labor resources within the materials handling facility.

Figure 4E:
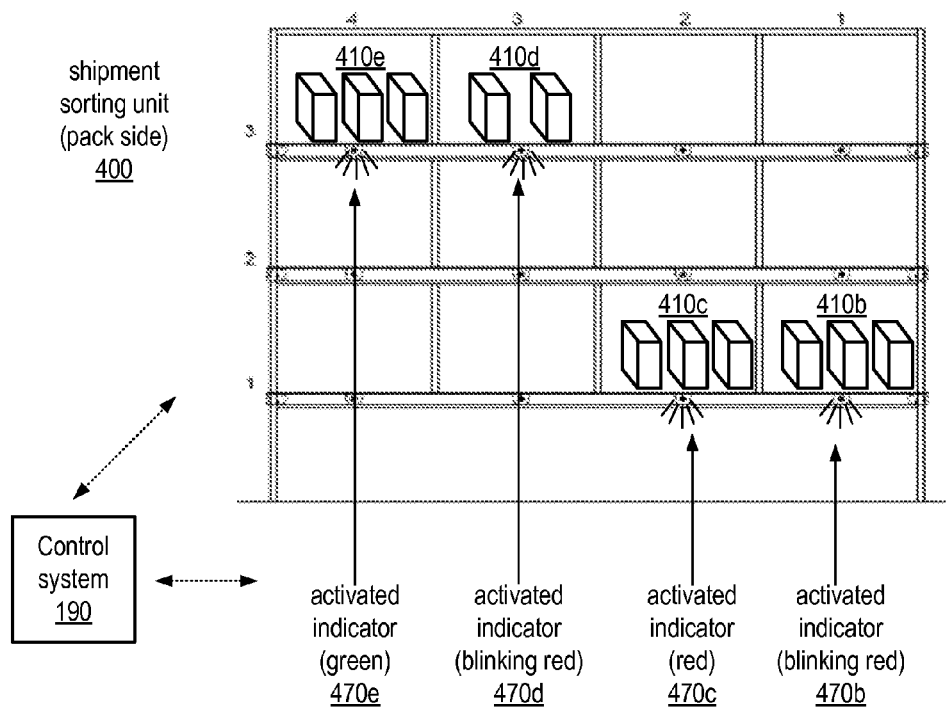

FIG. 4E illustrates the pack side of shipment sorting unit 400. In various embodiments, the agent manning the pack side of the shipment sorting unit may be an agent other than the agent manning the rebin side of the shipment sorting unit. Although, it is possible in some cases that a single agent could alternate between the rebin side and pack side of the sorting unit, such as might be necessary if labor resources (e.g., staffing) are running low. Control system 190 may be configured to determine which shipment sorting slots contain completed shipments on the pack side. For example, the control system may include one or more sensors for detecting shipments pushed through to the pack side. For instance, the control system may measure weight variances or utilize optical or motion sensors to determine the presence of shipments on the pack side of the shipment sorting unit.

For each of the completely sorted shipments present on the pack side of the shipment sorting unit, the control system may be configured to assign a processing priority for processing the completely sorted shipment. The granularity of the priority may be different in various embodiments. In one embodiment, the control system may assign only two different priorities, such as "low priority" and "high priority." In other cases, various quantities of priority levels may be assigned. For instance, such priorities might include "normal," "urgent" and "extremely urgent." In general any quantity of priorities may be assigned by the control system. In the illustrated embodiment, three different priorities are assigned. Such priorities will be referred to herein as "normal," "urgent" and "extremely urgent," respectively. As should be apparent, the normal priority designation reflects a priority that is lower than the urgent priority designation. Additionally, the urgent priority designation reflects a priority that is lower than the extremely urgent priority designation. Each priority may be associated with a corresponding indication that the control system is configured to provide to an agent via the various activated indicators 470*b-e* of FIG. 4E. In the illustrated embodiment, the control system causes indicator 470*e* to illuminate a green light, which indicates that the corresponding shipment in slot 410*e* is of normal priority. The control system also causes indicator 470*c* to illuminate a red light, which indicates that the corresponding shipment in slot 410*c* is of urgent priority. Additionally, the control system causes indicators 470*d* and 470*b* to illuminate a blinking red light (e.g., a series of illuminations), which indicates that the corresponding shipments in slot 410*d* and 410*b* are of extremely urgent priority. The prioritized indications may indicate to an agent an order in which shipments should be removed from their respective shipment sorting slots for additional processing (e.g., packing, gift wrapping, etc.). Additionally, such prioritized indications may also enable a management entity to gain visibility into whether agents are removing the highest priority shipments before moving lower priority shipments.

The control system may be configured to determine the priority for a given shipment based on a variety of factors. In some embodiments, the sooner a given shipment is scheduled to ship from the materials handling facility, the higher the priority designation assigned to that shipment. For instance, the control system may assign a shipment scheduled to leave the materials handling facility in one hour with a priority that is higher than a priority assigned to a shipment scheduled to leave the materials handling facility in eight hours. In some cases, some shipments may be designated as premium shipments (e.g., one or two day air shipments). The control system may in some embodiments assign a relatively high priority designation to such shipments.

In various embodiments, the priority of a given shipment may change over time. For instance, in some embodiments, a time threshold may be applied to various shipments. For an example threshold of five hours, if a given shipment is present on the sorting unit more than five hours before the shipment's scheduled departure time, the control system may assign a normal priority designation to the shipment. However, if the shipment still resides on the shipment sorting unit at a time that is less than five hours before a given shipment, the control system may change the shipments priority designation to an urgent priority designation as well as change the corresponding indication provided by the respective indicator for the shipment (e.g., the control system may change the illumination of the indicator from green to red). While the description presented herein largely describes priorities as being differentiated by color, in other embodiments other features may be utilized to differentiate priorities. In some embodiments, different sounds, images, video, text, multimedia, or other information may be utilized to differentiate priorities.

Figure 5:
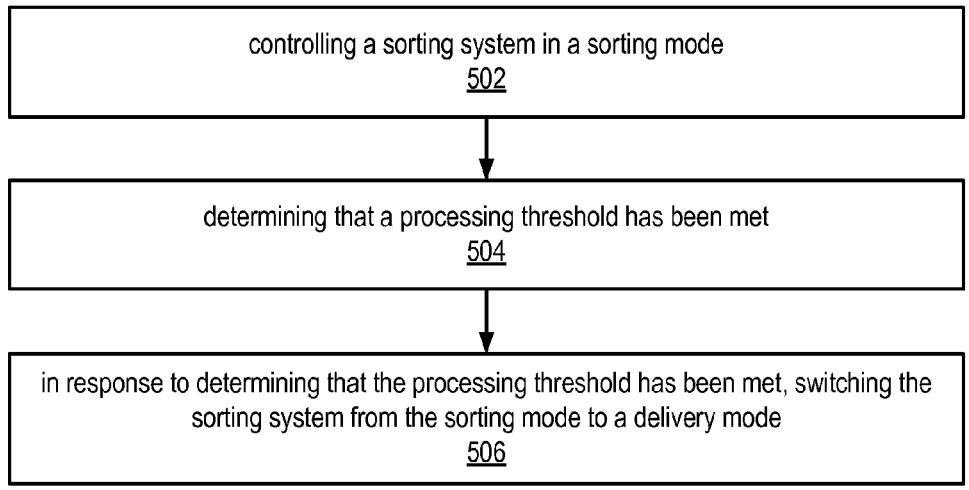
FIG. 5 illustrates a flowchart for an exemplary method transitioning from a sorting mode to a delivery mode of operation, according to some embodiments.

Various methods may be employed in embodiments of the system and method for directing indictor-based sortation of shipments. One such method includes the exemplary method illustrated by the flowchart of FIG. 5. In some embodiments, control system 190 may perform the method of FIG. 5 to manage operations on the rebin side of a shipment sorting unit, such as shipment sorting unit 400 described above. As illustrated by block 502, the method may begin by controlling a sorting system in a sorting mode. Such sorting system may include any of the various components described above, such as the control system and one or more order sorting units including sorting slots. In the sorting mode of operation, items may arrive at the shipment sorting unit from other locations within the materials handling facility (e.g., inventory 30). For example, items may be delivered to shipment sorting units via one or more conveyance mechanisms, such as a conveyor or sliding shoe sorter. In the sorting mode, the method may include determining the identity of such items either directly or through an intermediary component. For instance, in some embodiments, an agent may scan an item (e.g., unit 108 described above) with a reader (e.g., reader 196 described above), which may be a fixed, mobile, or hand-held reader. The method may include determining the identity of the item from the information collected by the reader.

In the sorting mode, the identified item may be assigned to a particular shipment sorting slot of a shipment sorting unit. The method may further include indicating to an agent a particular put operation that is to be performed (i.e., the particular shipment sorting slot in which the identified item is to be placed). To do so, the method may include activating an indicator (e.g., indicator 420a described above) that is dedicated to the shipment sorting slot that that has been assigned to the shipment to which the identified item belongs. In various embodiments, activating an indicator may include causing the indicator to: become illuminated, emit audio, display a message, and/or indicate some other information that may be perceived by an agent, such as a human operator. An activated indicator may indicate that the associated sorting slot is the sorting slot in which the current item is to be placed. The above described process of the sorting mode may be repeated for multiple other items. As items are placed in respective sorting slots, one or more sorting slots will eventually contain completely sorted shipments, which may later be packed for shipping from the materials handling facility.

Controlling a system in sorting mode may also include enforcing various rules on the sortation of items into sorting slots. For instance, in various embodiments, the method may include allowing only one item to be sorted at a given time. By enforcing such rule, the method may prevent an agent from sorting items to incorrect slots of a shipment sorting unit. To enforce such rule, in one embodiment the method may include serializing the sortation of items by an agent. For example, the method may include enforcing a rule that allows only one indicator to be active at a given time. In this way, the method may include requiring the agent to place the respective item in the sorting slot associated with that indicator (and/or confirm such placement via an input mechanism, such as a control, button or other input) before activation of another indicator indicating the slot in which a subsequent item is to be placed. In various embodiments, if an agent attempts to scan two items at the same time (e.g., scan with a reader, such as reader 196), the method may include activating an indicator for only the first item scanned. For instance, if the agent attempts to scan the second item before placing the first item on the shipment sorting unit, the method may include indicating to the agent that the second item can not be sorted until the first item has been placed on the shipment sorting unit, thereby preventing any potential error that may arise from the agent sorting two items at the same.

As indicated by blocks 504 and 506, the method may further include determining that a processing threshold has been met and in response to such determination switching the sorting system from the sorting mode to a delivery mode. As described above, as multiple items are placed on a given shipment sorting unit, one or more completely sorted shipments (or "complete shipments") may form in the sort portions of various shipment sorting slots (see e.g., FIG. 4C). Note that in various embodiments when a given shipment sorting slot comprises a completely sorted shipment in its sort portion, the method may include preventing additional items from being directed to the shipment sorting slot until the completed shipment is removed from the sort portion. (In various embodiments, this portion of the method may prevent errors, such as items being erroneously added to shipments that are already completely sorted.) To prevent a given shipment sorting unit from becoming deadlocked (i.e., full of completely sorted shipments), one or more of the completed shipments may need to be removed or pushed-through (described above) to make room for new shipments to be sorted. To make room for additional shipments, the method may include transitioning or switching the sorting system into a delivery mode, one example of which includes the delivery mode described above with respect to FIGS. 4B-D.

In various embodiments, the method may include switching the sorting system to the delivery mode in response to determining that a processing threshold has been met (blocks 504-506). In one embodiment, one such processing threshold may specify a period of time since the sorting system was last in the delivery mode. Accordingly, the method may include monitoring the time elapsed since the last time the sorting system was switched to the delivery mode. For instance, if a threshold of 10 minutes is implemented, the method may include ensuring that the sorting system is placed in the delivery mode at least every 10 minutes. Since push-through operations are performed in the delivery mode, this may ensure that the rebin side of the order sorting unit does not become deadlocked with too many completed shipments. In other embodiments, one such processing threshold may specify a particular quantity of completed shipments in the shipment sorting unit. For instance, if a shipment sorting unit has 12 sorting slots and the shipment sorting unit is never to be more than half full, the processing threshold may be set to 6 completed shipments. In some cases, such a threshold may be specific to a particular size of sorting slots (e.g., small, medium, large, etc.) or to a particular portion of the sorting slots (e.g., the sort portion of the sorting slots). For example, in the case where a shipment sorting unit contains various sorting slot sizes (e.g., FIG. 3), thresholds may be applied to particular sizes of sorting slots. For instance, in the sorting unit of FIG. 3, there are six 16" by 16" sorting slots. In such example, the method may include applying a threshold of three 16" by 16" sorting slots to ensure that a push-through operation is to be performed if half or more of the 16" by 16" sorting slots contain completed shipments. In other embodiments, such thresholds may be applied to other sorting sizes.

In any case, in response to determining that one or more of such processing thresholds have been met, the method may include switching the sorting system from the sorting mode to the delivery mode. In some embodiments, the delivery mode may include, for each shipment sorting slot that contains a completely sorted shipment, activating a respective indicator (e.g., the indicator dedicated to that shipment sorting slot) to indicate that the completely sorted shipment of that sorting slot is to be delivered to a next processing stage. The next processing stage may include, e.g., packing, gift wrapping, or any other processing stage that is to be performed prior to shipping the shipment from the materials handling facility. In various embodiments, delivering the completed shipments to a next processing stage may include performing a push-through operation where completed shipments are moved from sort portions of their respective sorting slots to the pack portions of their respective sorting slots. In other cases, the completed shipments may be moved from their respective sorting slots entirely, such as might be the case if the shipments were delivered to another sorting station. In some embodiments, the method may also include switching the sorting system from the delivery mode back to the sorting mode. For instance, after the sorting system has been in the delivery mode for some time, one or more shipment sorting slots on the rebin side of the shipment sorting unit may be freed up. Accordingly, the method may include resuming the sorting mode so that additional shipments may be sorted.

In various embodiments, the method may also include monitoring the incoming workload of an agent manning the rebin side of the shipment sorting unit. For instance, such workload may correspond to shipments undergoing picking in inventory 30 or shipments en route to the shipment sorting unit on a conveyance system. Since such workload may fluctuate while an agent is manning the shipment sorting unit, the method may include performing the switch to the delivery mode when the agent has a low point or lull in incoming workload. Such technique may in various embodiments efficiently utilize labor resources within the materials handling facility.

In various embodiments, when one mode is active, the method may include disabling or preventing operations of the other mode. For instance, if the sorting system is in the delivery mode where shipments are pushed from the rebin side of a shipment sorting unit to the pack side of the shipment sorting unit, the method may include preventing one or more (or all) operations of the sorting mode. For instance, if while the system is in delivery mode an agent attempts to scan an item with his reader, instead of activating an indicator to indicate a put operation, the method may include providing the agent with a message via the reader (or another device) such as "delivery mode operations only" or "complete push-through operations before attempting additional put operations" or some similar message. In other cases, no message may be necessary.

Figure 6:
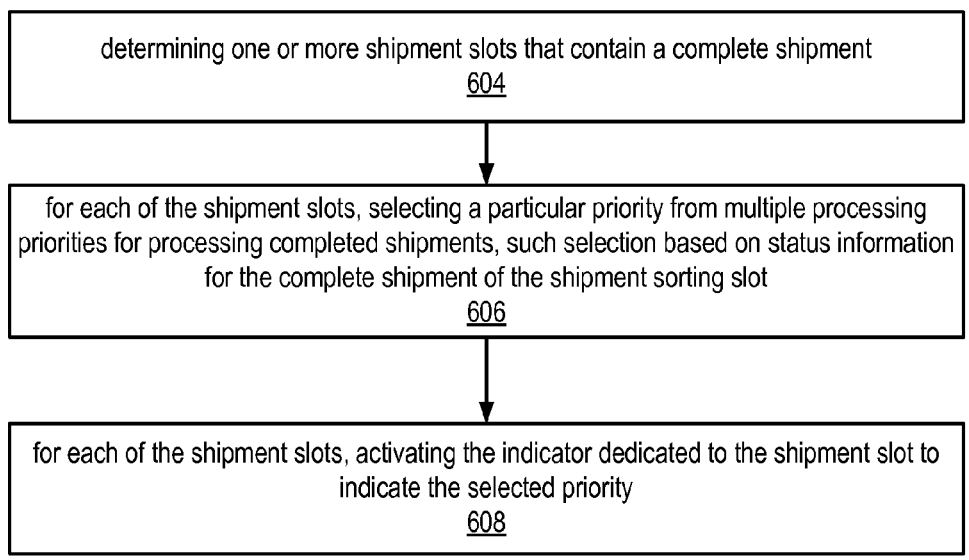
FIG. 6 illustrates a flowchart for an exemplary method of utilizing indicators to prioritize the processing of sorted shipments in a materials handling facility, according to some embodiments.

FIG. 6 illustrates a method for prioritizing the removal of shipment from shipment sorting units (or any other type of unit configured to hold shipments in various slots) for further processing in the materials handling facility. The method illustrated by FIG. 6 may in various embodiments be performed by control system 190 described above. As illustrated by block 604, the method may include determining one or more shipment slots that contain a complete shipment. In some embodiments, this determination may be specific to the pack side of a shipment sorting unit. In other words, the method may include determining one or more shipment slots that contain completed shipments in their pack portion, such as slots 410d and 410e of FIG. 4D described above. In various embodiments, the method may include utilizing one or more weight, motion, optical or other sensors to determine that one or more shipment slots (and/or pack portions of such shipment slots) contain completed shipments.

As illustrated by block 606, the method may include, for each given shipment slot of the shipment slots determined to contain a completed shipment, selecting a particular priority from multiple processing priorities for processing completed shipments. Such selection may in various embodiments be based on status information for the complete shipment of the given shipment sorting slot. In various embodiments, the various processing priorities may each correspond to different priorities for processing a shipment. For instance, one such priority may be an "extremely urgent" priority for a shipment that needs to be processed (e.g., packed and shipped) as soon as possible. Other less urgent priorities might include an "urgent" priority or a "normal" priority, such as the processing priorities described above with respect to FIG. 4E. The selection of a given processing priority for a complete shipment of a given shipment slot may be based on various status information associated with the complete shipment. In one embodiment, such status information may include the time at which the complete shipment is scheduled to depart from the materials handling facility. For instance, the sooner the shipment is scheduled to depart from the materials handling facility, the higher the priority selected for that shipment in various embodiments of the method. Likewise, the later the shipment is scheduled to depart from the materials handling facility, the lower the priority selected for that shipment. In some embodiments, the status information may include information that specifies a preparation time indicative of the amount of time necessary to prepare the completed shipment to be shipped from the materials handling facility. For instance, the longer the preparation time, the higher the priority selected for that shipment in various embodiments of the method. Likewise, the shorter the preparation time, the lower the priority selected for that shipment. In other embodiments, such status information may include shipment designations associated with the given complete shipment. For instance, the complete shipment may be designated as having an expedited shipping status (e.g., overnight or 2-day air delivery). In such cases, the method may include selecting a higher priority for such shipments.

As illustrated by block 608, the method may further include, for each of the shipment slots, activating the indicator dedicated to the shipment slot to indicate the selected priority. In various embodiments, activating the indicator may include causing the indicator to illuminate. In some cases, specific colors may be used to indicate particular priorities (e.g., green for low priority, red for high priority, as illustrated in FIG. 4E). In other cases, a series of illuminations may be used to indicate a particular priority. For instance, the method may include generating a blinking red light via one of the indicators to indicate that the corresponding shipment is of a high priority. In various embodiments, the method may include activating an indicator in other ways, such as causing the indicator to emit audio, display a message, and/or indicate some other information that may be perceived by an agent, such as a human operator.

In various embodiments, some shipments may assume the priority designation of other shipments. For instance, the method described herein may include determining that a given shipment sorting slot includes two (or more) completely sorted shipments. For instance, a first shipment may be located in the pack portion of the given shipment sorting slot and a second completely sorted shipment may be queued behind that shipment. For instance, the second shipment might be located in the sort portion of the given shipment. In other words, the second shipment in some cases cannot be processed on the pack side until after the first shipment has been removed from the shipment sorting slot. In many cases (e.g., when the priority assigned to the second shipment is higher than that assigned to the first shipment), the method may include activating the indicator of the given shipment sorting slot according to the highest priority of the shipments in the sorting slot (e.g., the priority of the second shipment). In this way, even if the first shipment is assigned a priority lower than that of the second shipment, both shipments will be processed according to the higher priority (e.g., the priority of the second shipment) to minimize delay in processing the second shipment.

While the description largely refers to shipment sorting slots as components of a shipment sorting unit, the shipment sorting slots need not be components of any particular sorting unit in some embodiments. In some cases, the shipment sorting slots may be individually designated areas not necessarily coupled to one another. For instance, in one embodiment, shipment sorting slots may be nothing more than designated areas, such as portions of a facility floor. In general, a given shipment sorting slot may include any defined area or volume within a materials handling facility.

Exemplary System

Figure 7:
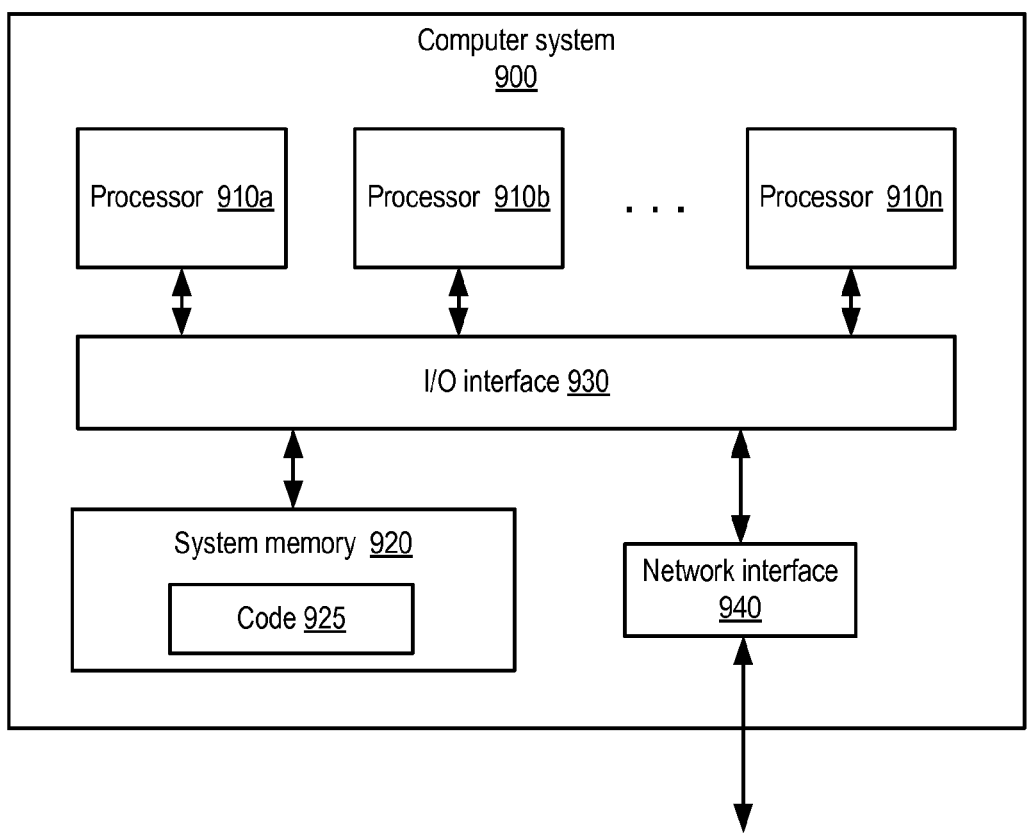
FIG. 7 is a block diagram illustrating an exemplary embodiment of a computer system.

In one embodiment, a system that implements one or more components of a system and method for directing indicator-based sortation of shipments as described herein may include a general-purpose computer system that includes or is configured to access one or more computer-accessible media, such as computer system 900 illustrated in FIG. 7. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system 190 of a system and method for directing indicator-based sortation of shipments, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems, communications devices, control mechanisms, readers, scanners and so on that are components of the system and method for directing indicator-based sortation of shipments. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 6 for implementing a control system or possibly other components of a system and method for directing indicator-based sortation of shipments. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that embodiments embrace all such modifications and changes and, accordingly, the above description to be regarded in an illustrative rather than a restrictive sense.

What is claimed is:

1. A sorting system, comprising:
   a shipment sorting unit comprising a plurality of shipment sorting slots for sorting items into respective shipments, and an indicator dedicated to each shipment sorting slot;
   a control system configured to:
      control the sorting system in a sorting mode, wherein during the sorting mode the control system is configured to, for a given item to be sorted, activate an indicator dedicated to a particular sorting slot of said plurality of shipment sorting slots assigned to the shipment to which the given item belongs, wherein activation of the indicator indicates the given item is to be placed in said particular sorting slot;
      control the sorting system in a delivery mode, wherein during the delivery mode the control system is configured to, for each given shipment sorting slot that contains a completely sorted shipment, activate a respective indicator dedicated to the given shipment sorting slot, wherein activation of the indicator indicates the completely sorted shipment is to be delivered to a next processing stage;

in response to determining that a processing threshold has been met, switch the sorting system from the sorting mode to the delivery mode.

2. The sorting system of claim 1, wherein to determine that the processing threshold has been met, the control system is configured to determine that a particular amount of time has elapsed with respect to a reference time.

3. The sorting system of claim 2, wherein said reference time is a time at which said sorting system was previously placed in said delivery mode.

4. The sorting system of claim 1, wherein to determine that the processing threshold has been met, the control system is configured to determine that a particular quantity of shipments have been completely sorted within one or more of the plurality of the shipment sorting slots.

5. The sorting system of claim 1, wherein to determine that the processing threshold has been met, the control system is configured to determine that a particular quantity of shipments have been completely sorted within one or more of the plurality of shipment sorting slots of a particular slot size.

6. The sorting system of claim 1, wherein activating a given indicator comprises illuminating the given indicator.

7. A system, comprising:
a unit comprising a plurality of shipment slots each configured to hold items of a shipment, and an indicator dedicated to each shipment slot;
a control system configured to:
for each of said plurality of shipment slots, determine whether that shipment slot contains a complete shipment of items;
for each of said plurality of shipment slots, control the respective dedicated indicator to indicate one of a plurality of different processing priorities for processing a complete shipment;
for each given shipment slot determined to contain a complete shipment, select a particular priority of said plurality of processing priorities based on status information for the complete shipment, and activate the indicator dedicated to the given shipment sorting slot to indicate the selected priority.

8. The system of claim 7, wherein the control system is further configured to:
determine that a particular shipment slot comprises a first complete shipment and a second complete shipment queued behind the first complete shipment in the particular shipment slot;
assign a different one of said plurality of processing priorities to the first complete shipment and the second complete shipment;
activate the indicator of the particular shipment slot to indicate the priority of the second complete shipment such that the first complete shipment is designated to be processed according to the priority of the second complete shipment.

9. The system of claim 7, wherein the selected priority is a priority for removing the complete shipment from the respective shipment slot and packing the complete shipment in a shipping container.

10. The system of claim 7, wherein to activate a given indicator the control system is configured to illuminate the given indicator according to a particular color corresponding to a respective one of the plurality of processing priorities.

11. The system of claim 7, wherein to activate a given indicator the control system is configured to illuminate the given indicator to display a series of illuminations corresponding to a respective one of the plurality of processing priorities.

12. The system of claim 7, wherein the status information indicates a time by which the complete shipment is scheduled to be shipped from the materials handling facility, wherein the selection of said particular priority is based on said time by which the complete shipment is scheduled to be shipped.

13. The system of claim 7, wherein the status information indicates a specified amount of time to prepare the complete shipment for shipment from the materials handling facility, wherein the selection of said particular priority is based on said specified amount of time to prepare the complete shipment for shipment.

14. The system of claim 7, wherein the status information indicates the complete shipment has been associated with an expedited shipping status, wherein the selection of said particular priority is based on said expedited shipping status.

15. A sorting system, comprising:
a shipment sorting unit comprising a plurality of shipment sorting slots for sorting items into respective shipments, wherein each shipment sorting slot comprises a sort portion and a pack portion;
for each sort portion of each shipment sorting slot and each pack portion of each shipment sorting slot, an indicator dedicated to the respective portion of the shipment sorting slot;
a control system configured to:
control the sorting system in a sorting mode, wherein during the sorting mode the control system is configured to direct the sorting of items via the indicators dedicated to the sorting portions of the shipment sorting slots;
control the sorting system in a delivery mode, wherein during the delivery mode the control system is configured to indicate, via the indicators dedicated to the sort portions of the shipment sorting slots, that each of one or more completely sorted shipments are to be delivered to the pack portion of the shipment sorting slot in which that completely sorted shipment resides;
for each given pack portion determined to contain a given completely sorted shipment, select a particular priority of a plurality of processing priorities based on status information for the completely sorted shipment of that pack portion, and activate the indicator dedicated to that pack portion to indicate the selected priority.

16. The sorting system of claim 15, wherein the control system is further configured to:
determine that a particular shipment sorting slot comprises a first completely sorted shipment and a second completely sorted shipment queued behind the first completely sorted shipment in the particular shipment slot;
assign a different one of said plurality of processing priorities to the first completely sorted shipment and the second completely sorted shipment;
activate the indicator of the particular shipment slot to indicate the priority of the second completely sorted shipment such that the first completely sorted shipment is designated to be processed according to the priority of the second completely sorted shipment.

17. The sorting system of claim 15, wherein the selected priority is a priority for removing the completely sorted shipment from the respective shipment slot and packing the completely sorted shipment in a shipping container.

18. The sorting system of claim 15, wherein to activate a given indicator the control system is configured to illuminate the given indicator according to a particular color corresponding to a respective one of said plurality of processing entities.

19. The sorting system of claim 15, wherein to activate a given indicator the control system is configured to illuminate the given indicator to display a series of illuminations corresponding to a respective one of said plurality of processing entities.

20. The sorting system of claim 15, wherein the status information indicates a time by which the completely sorted shipment is scheduled to be shipped from the materials handling facility, wherein the selection of the particular priority is based on said time by which the completely sorted shipment is scheduled to be shipped.

21. The sorting system of claim 15, wherein the status information indicates a specified amount of time to prepare the given completely sorted shipment for shipment from the materials handling facility, wherein the selection of the particular priority is based on said specified amount of time to prepare the given completely sorted shipment.

22. The sorting system of claim 15, wherein the status information indicates the given completely sorted shipment has been associated with an expedited shipping status, wherein the selection of the particular priority is based on said expedited shipping status.

23. The sorting system of claim 15, wherein the control system is configured to, in response to determining that a processing threshold has been met, switch the sorting system from the sorting mode to the delivery mode.

24. A computer-implemented method for controlling a sorting system that includes a shipment sorting unit including a plurality of shipment sorting slots for sorting items into respective shipments, and an indicator dedicated to each shipment sorting slot, the method comprising:
controlling the sorting system in a sorting mode, wherein controlling the sorting system in the sorting mode comprises, for a given item to be sorted, activating an indicator dedicated to a particular sorting slot of said plurality of shipment sorting slots assigned to the shipment to which the given item belongs, wherein activation of the indicator indicates the given item is to be placed in said particular sorting slot; and
in response to determining that a processing threshold has been met:
stopping the sorting mode, and
controlling the sorting system in a delivery mode, wherein controlling the sorting system in the delivery mode comprises, for each given shipment sorting slot that contains a completely sorted shipment, activate a respective indicator dedicated to the given shipment sorting slot, wherein activation of the indicator indicates the completely sorted shipment is to be delivered to a next processing stage.

25. The method of claim 24, wherein determining that the processing threshold has been met comprises determining that a particular amount of time has elapsed with respect to a reference time.

26. The method of claim 25, wherein said reference time is a time at which said sorting system was previously placed in said delivery mode.

27. The method of claim 24, wherein determining that the processing threshold has been met comprises determining that a particular quantity of shipments have been completely sorted within one or more of the plurality of the shipment sorting slots.

28. The method of claim 24, wherein determining that the processing threshold has been met comprises determining that a particular quantity of shipments have been completely sorted within one or more of the plurality of shipment sorting slots of a particular slot size.

29. The method of claim 24, wherein activating a given indicator comprises illuminating the given indicator.

30. A computer-implemented method, comprising:
for each of a plurality of shipment slots configured to hold items of a shipment, determining whether that shipment slot contains a complete shipment of items, wherein each given shipment slot of said plurality of shipment slots is associated with an indicator dedicated to the given shipment slot;
for each of said plurality of shipment slots, controlling the respective dedicated indicator to indicate one of a plurality of different processing priorities for processing a complete shipment;
for each given shipment slot determined to contain a complete shipment, selecting a particular priority of said plurality of processing priorities based on status information for the complete shipment, and activating the indicator dedicated to the given shipment sorting slot to indicate the selected priority.

31. The method of claim 30, further comprising:
determining that a particular shipment slot comprises a first complete shipment and a second complete shipment queued behind the first complete shipment in the particular shipment slot;
assigning a different one of said plurality of processing priorities to the first complete shipment and the second complete shipment;
activating the indicator of the particular shipment slot to indicate the priority of the second complete shipment such that the first complete shipment is designated to be processed according to the priority of the second complete shipment.

32. The method of claim 30, wherein the selected priority is a priority for removing the complete shipment from the respective shipment slot and packing the complete shipment in a shipping container.

33. The method of claim 30, wherein activating a given indicator comprises illuminating the given indicator according to a particular color corresponding to a respective one of the plurality of processing priorities.

34. The method of claim 30, wherein activating a given indicator comprises illuminating the given indicator to display a series of illuminations corresponding to a respective one of the plurality of processing priorities.

35. The method of claim 30, wherein the status information indicates a time by which the complete shipment is scheduled to be shipped from the materials handling facility, wherein selecting said particular priority comprises selecting said particular priority based on said time by which the complete shipment is scheduled to be shipped.

36. The method of claim 30, wherein the status information indicates a specified amount of time to prepare the complete shipment for shipment from the materials handling facility, wherein selecting said particular priority comprises selecting said particular priority based on said specified amount of time to prepare the complete shipment for shipment.

37. A computer-readable storage medium, storing program instructions computer-executable to implement a control system configured to:
control a sorting system that includes a shipment sorting unit including a plurality of shipment sorting slots for sorting items into respective shipments, and an indicator dedicated to each shipment sorting slot;

control the sorting system in a sorting mode, wherein during the sorting mode the control system is configured to, for a given item to be sorted, activate an indicator dedicated to a particular sorting slot of said plurality of shipment sorting slots assigned to the shipment to which the given item belongs, wherein activation of the indicator indicates the given item is to be placed in said particular sorting slot; and control the sorting system in a delivery mode, wherein during the delivery mode the control system is configured to, for each given shipment sorting slot that contains a completely sorted shipment, activate a respective indicator dedicated to the given shipment sorting slot, wherein activation of the indicator indicates the completely sorted shipment is to be delivered to a next processing stage;

in response to determining that a processing threshold has been met, switch the sorting system from the sorting mode to the delivery mode.

38. The medium of claim 37, wherein to determine that the processing threshold has been met, the control system is configured to determine that a particular amount of time has elapsed with respect to a reference time.

39. The medium of claim 38, wherein said reference time is a time at which said sorting system was previously placed in said delivery mode.

40. The medium of claim 37, wherein to determine that the processing threshold has been met, the control system is configured to determine that a particular quantity of shipments have been completely sorted within one or more of the plurality of the shipment sorting slots.

41. The medium of claim 37, wherein to determine that the processing threshold has been met, the control system is configured to determine that a particular quantity of shipments have been completely sorted within one or more of the plurality of shipment sorting slots of a particular slot size.

42. The medium of claim 37, wherein to activate a given indicator the control system is configured to illuminate the given indicator.

43. A computer-readable storage medium, storing program instructions computer-executable to:

for each of a plurality of shipment slots configured to hold items of a shipment, determine whether that shipment slot contains a complete shipment of items, wherein each given shipment slot of said plurality of shipment slots is associated with an indicator dedicated to the given shipment slot;

for each of said plurality of shipment slots, control the respective dedicated indicator to indicate one of a plurality of different processing priorities for processing a complete shipment;

for each given shipment slot determined to contain a complete shipment, select a particular priority of said plurality of processing priorities based on status information for the complete shipment, and activate the indicator dedicated to the given shipment sorting slot to indicate the selected priority.

44. The medium of claim 43, wherein the program instructions are further configured to:

determine that a particular shipment slot comprises a first complete shipment and a second complete shipment queued behind the first complete shipment in the particular shipment slot;

assign a different one of said plurality of processing priorities to the first complete shipment and the second complete shipment;

activate the indicator of the particular shipment slot to indicate the priority of the second complete shipment such that the first complete shipment is designated to be processed according to the priority of the second complete shipment.

45. The medium of claim 43, wherein the selected priority is a priority for removing the complete shipment from the respective shipment slot and packing the complete shipment in a shipping container.

46. The medium of claim 43, wherein to activate a given indicator the program instructions are further configured to illuminate the given indicator according to a particular color corresponding to a respective one of the plurality of processing priorities.

47. The medium of claim 43, wherein to activate a given indicator the program instructions are further configured to illuminate the given indicator to display a series of illuminations corresponding to a respective one of the plurality of processing priorities.

48. The medium of claim 43, wherein the status information indicates a time by which the complete shipment is scheduled to be shipped from the materials handling facility, wherein to select said particular priority the program instructions are configured to select said particular priority based on said time by which the complete shipment is scheduled to be shipped.

49. The medium of claim 43, wherein the status information indicates a specified amount of time to prepare the complete shipment for shipment from the materials handling facility, wherein to select said particular priority the program instructions are configured to select said particular priority based on said specified amount of time to prepare the complete shipment for shipment.

* * * * *